United States Patent
Moore et al.

(10) Patent No.: US 11,965,818 B1
(45) Date of Patent: Apr. 23, 2024

(54) CORROSION MONITOR

(71) Applicant: MOPEKA PRODUCTS LLC, New Braunfels, TX (US)

(72) Inventors: Joel Reese Moore, New Braunfels, TX (US); Jonathan Louis Kaufmann, Shavano Park, TX (US); Jason Duane Peck, Leander, TX (US)

(73) Assignee: Mopeka Products LLC, New Braunfels, TX (US)

( * ) Notice: Subject to any disclaimer, the term of this patent is extended or adjusted under 35 U.S.C. 154(b) by 0 days.

(21) Appl. No.: 17/333,370

(22) Filed: May 28, 2021

Related U.S. Application Data (60) Provisional application No. 63/031,555, filed on May 28, 2020.

(51) Int. Cl.
```
G01N 17/00    (2006.01)
G01N 17/02    (2006.01)
G01N 17/04    (2006.01)
```
(52) U.S. Cl.
CPC ........... *G01N 17/006* (2013.01); *G01N 17/02* (2013.01); *G01N 17/04* (2013.01)

(58) Field of Classification Search
CPC ....... G01N 17/02; G01N 17/04; G01N 17/006
USPC ................................................. 324/71.2, 700
See application file for complete search history.

(56) References Cited

U.S. PATENT DOCUMENTS

| | | |
|---|---|---|
| 4,457,821 A | 7/1984 | Sudrabin et al. |
| 5,339,911 A | 8/1994 | Whited |
| 5,344,781 A * | 9/1994 | Kitchen ............... G01N 33/241 436/60 |
| 5,547,311 A | 8/1996 | Kenda |
| 5,596,267 A * | 1/1997 | Lara ....................... G01N 17/02 204/402 |
| 6,809,506 B2 | 10/2004 | Thomas, III et al. |

(Continued)

FOREIGN PATENT DOCUMENTS

| | | | | |
|---|---|---|---|---|
| CA | 2552145 C | * | 9/2012 | ............. B09C 1/002 |
| CN | 103868977 A | * | 6/2014 | ........... G01N 17/006 |

(Continued)

OTHER PUBLICATIONS mesaproducts.com—Cathodic Protection for Undergroudn Propane Tanks. Sep. 2020 (Year: 2020).*

(Continued)

*Primary Examiner* — Patrick Assouad
*Assistant Examiner* — Sean Curtis
(74) *Attorney, Agent, or Firm* — Mackey Law Firm PLLC (57) ABSTRACT

A system for monitoring an underground propane tank, comprising a controller; a moisture sensor coupled in communication with the controller, wherein the controller is configured to measure a moisture associated with the tank; a voltage probe coupled in communication with the controller, wherein voltage probe is adapted to be disposed at least partially underground, and wherein the controller is configured to measure a potential difference between the tank and soil surrounding the tank, when the moisture associated with the tank is measured to be above a predetermined threshold; and an anode sensor coupled to an anode of the tank and coupled in communication with the controller, wherein the controller is configured to monitor the anode using the anode sensor.

20 Claims, 6 Drawing Sheets

(56) References Cited

U.S. PATENT DOCUMENTS

| | | | |
|---|---|---|---|
| 6,841,059 B1 | 1/2005 | Staerzl | |
| 6,902,661 B2 | 6/2005 | Thomas, III et al. | |
| 7,068,052 B2 | 6/2006 | Hilleary et al. | |
| 7,208,117 B2 | 4/2007 | Hays et al. | |
| 7,951,286 B2 | 5/2011 | Dwars et al. | |
| 8,030,951 B2 | 10/2011 | Peters | |
| 8,298,382 B2 | 10/2012 | Hanlon et al. | |
| 8,310,251 B2 | 11/2012 | Orazem | |
| 9,194,856 B2* | 11/2015 | Liu | G01N 33/2028 |
| 9,428,375 B2 | 8/2016 | Sabo et al. | |
| 9,441,307 B2 | 9/2016 | Al-Zahrani | |
| 10,060,870 B2* | 8/2018 | Raupach | G01N 33/383 |
| 2002/0134690 A1* | 9/2002 | Lyublinski | C23F 13/04 204/196.16 |
| 2003/0169058 A1* | 9/2003 | Pierre | G01N 17/02 324/700 |
| 2006/0070871 A1 | 4/2006 | Bushman et al. | |
| 2011/0238347 A1 | 9/2011 | Gemperli et al. | |
| 2014/0170754 A1* | 6/2014 | Liu | G01N 17/006 436/2 |
| 2016/0313271 A1* | 10/2016 | Raupach | G01N 27/048 |
| 2016/0358751 A1* | 12/2016 | Lee | C23C 16/45544 |
| 2017/0030850 A1* | 2/2017 | Castaneda-Lopez | G01N 27/20 |
| 2017/0067736 A1* | 3/2017 | Silverman | G01N 27/021 |
| 2021/0276890 A1* | 9/2021 | Andrew | C23F 13/04 |
| 2021/0389231 A1* | 12/2021 | Breuer | G01F 15/08 |
| 2022/0221387 A1* | 7/2022 | Oki | G01N 17/02 |

FOREIGN PATENT DOCUMENTS

| | | | |
|---|---|---|---|
| CN | 205686930 U * | 11/2016 | |
| CN | 103868977 B * | 4/2017 | G01N 17/006 |
| CN | 109868480 A * | 6/2019 | |
| CN | 111357125 A * | 6/2020 | B67D 7/04 |
| CN | 111850570 A * | 10/2020 | C23F 13/06 |
| CN | 112798520 A * | 5/2021 | |
| CN | 213736796 U * | 7/2021 | |
| CN | 215116254 U * | 12/2021 | |
| CN | 215511582 U * | 1/2022 | |
| DE | 3613816 A1 | 10/1987 | |
| EP | 1152235 A1 * | 11/2001 | C23F 13/04 |
| EP | 1154459 A2 * | 11/2001 | H01J 37/32009 |
| EP | 2743674 A1 * | 6/2014 | G01N 17/006 |
| EP | 3069129 B1 * | 9/2020 | G01N 27/048 |
| EP | 3848697 A1 * | 7/2021 | C23F 13/06 |
| FR | 2213355 B1 | 7/1977 | |
| HU | 212226 B * | 4/1996 | |
| JP | H0612130 A * | 1/1994 | |
| JP | H08193282 A * | 7/1996 | |
| JP | 329205 B2 * | 6/2002 | |
| JP | 3290205 B2 * | 6/2002 | |
| JP | 2004101349 A * | 4/2004 | |
| JP | 3606081 B1 * | 1/2005 | |
| JP | 3606081 B2 * | 1/2005 | |
| JP | 2005308736 A * | 11/2005 | |
| JP | WO2004063737 A1 * | 5/2006 | |
| JP | 4089360 B2 * | 5/2008 | |
| JP | 4178021 B2 * | 11/2008 | |
| JP | 4599203 B2 * | 12/2010 | |
| JP | 4601155 B2 * | 12/2010 | |
| JP | 2014047387 A * | 3/2014 | |
| JP | 2019066300 A * | 4/2019 | |
| JP | 2020012189 A * | 1/2020 | |
| JP | 2021162491 A * | 10/2021 | |
| KR | 100406026 | 5/2003 | |
| KR | 100406026 B1 * | 11/2003 | |
| KR | 20170071983 A * | 6/2007 | |
| KR | 101606417 B1 * | 3/2016 | |
| KR | 20170071983 A * | 6/2017 | |
| KR | 101764624 B1 * | 8/2017 | |
| WO | WO-0184117 A2 * | 11/2001 | C23F 13/04 |
| WO | WO-2005053866 A1 * | 6/2005 | B09C 1/002 |
| WO | WO-2015108525 A1 * | 7/2015 | C23F 13/00 |
| WO | WO-2020234958 A1 * | 11/2020 | G01N 11/00 |
| WO | WO-2021178616 A1 * | 9/2021 | C02F 1/4602 |

OTHER PUBLICATIONS

Paraco—How Our Experts Prevent Propane Tank Corrosion with Anode Bags. Mar. 8, 2022 (Year: 2022).*

US Dept of Defense—Unified Facilities Criteria (UFC)—Cathodic Protection—Nov. 28, 2016 (Year: 2016).*

English Translation of Furukawa et al. (JP 2005308736 A). (Year: 2021).*

AUCSCO, Appalachian Underground Corrosion Short Course, West Virgina University, Morgantown, West Virgina, 2017, pp. 1-80.

AUCSCO, Appalachian Underground Corrosion Short Course, West Virgina University, Morgantown, West Virgina, 2017, pp. 81-164.

AUCSCO, Appalachian Underground Corrosion Short Course, West Virgina University, Morgantown, West Virgina, 2017, pp. 165-246.

Numerical analysis on cathodic protection of underground structures, EEE Xplore Digital Library | IEEE-SA | IEEE Spectrum; IEEE Xplore: Dec. 29, 2016; 13th Selected Issues of Electrical Engineering and Electronics (WZEE).

Underground Tank Technology Update, vol. 16, No. 5, Sep./Oct. 2002.

https://www.keen-ritecorp.com/c-1399-monster-soap-special-aspx, Single Anode Bag for 500 Gallon Underground Tank.

* cited by examiner

CORROSION MONITOR

CROSS REFERENCE TO RELATED APPLICATIONS

This application claims the benefit of U.S. Provisional Patent Application No. 63/031,555 filed May 28, 2020, the entirety of which is hereby incorporated by reference herein.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present disclosure generally relates to corrosion monitoring and more specifically relates to monitoring corrosion of tanks and anodes for tanks.

Description of the Related Art

Underground tanks (e.g., metal propane tanks) have become popular in recent years, including because the tank is disposed largely or wholly out of sight, which can be desirable or even required in some areas such as residential developments. A long-standing problem with underground tanks is corrosion. The main type of corrosion is galvanic corrosion, in which the tank acts as an anode in the electrolytic soil thus accelerating corrosion of the tank.

There are a number of preventative measures used (and/or required by some jurisdictions) for such underground installations, including tank coatings, specified backfill and use of a sacrificial anode. A sacrificial anode is generally a block of metal, typically zinc or similar, connected to the tank by a copper wire. The anode is buried near the tank and the potential of the anode is intended to force the corrosion to occur at the sacrificial anode and not the tank.

Since the anode is intended to corrode, it eventually will become small and ineffective and will need to be replaced periodically. Therefore, some jurisdictions require periodic testing, typically every 1-3 years, to evaluate the anode. The testing involves measuring the potential difference between the ground and the tank. A voltmeter can be connected to the tank on one side and a test probe pushed into the ground near the tank. There are industry established limits for the value of the measured voltage that indicates the anode is no longer working and should be replaced.

It is an industry wide problem that this periodic testing is not performed on schedule, or perhaps at all. For instance, it is simply too time consuming and tedious for some propane companies to perform the testing and keep the appropriate records. Likewise, it is difficult and expensive for the governing bodies of the jurisdictions to check the companies to verify testing. Another problem is that the testing is dependent on both the person(s) performing the testing and the moisture level of the soil. Without following standard procedures, the results can be misleading or inaccurate if conditions are not met as specified in the procedures. The lack of testing and/or the dependence on inaccurate test results is a considerable safety hazard and can leave many companies and government entities open to potential liability issues.

Accordingly, a need exists in the art for improved devices, systems and methods for corrosion monitoring.

BRIEF SUMMARY OF THE INVENTION

Applicants have created improved devices, systems and methods for corrosion monitoring, including but not limited to for monitoring corrosion of a metal tank disposed at least partially underground, such as a tank for holding liquid propane gas (LPG) or another substance. In at least one embodiment, monitoring corrosion of a tank can include measuring electrical potential between the tank and the ground and/or monitoring the size and/or another condition of one or more sacrificial anodes associated with the tank. A system can include a controller, one or more sensors operably coupled to the controller and communication equipment for communicating data to and/or from a remote user interface.

In at least one embodiment, a system for monitoring an underground propane tank comprises a controller, a moisture sensor coupled in communication with the controller, a voltage probe coupled in communication with the controller, and an anode sensor coupled to an anode of the tank and coupled in communication with the controller. In at least one embodiment, the system further includes a remote user interface in electronic communication with the controller.

In at least one embodiment, the controller is configured to measure a moisture associated with the tank. In at least one embodiment, the voltage probe is adapted to be disposed at least partially underground. In at least one embodiment, the controller is configured to measure a potential difference between the tank and soil surrounding the tank. In at least one embodiment, the controller is configured to measure the potential difference when the moisture associated with the tank is measured to be above a predetermined threshold. In at least one embodiment, the controller is configured to refrain from measuring the potential difference when the moisture associated with the tank is measured to be below the predetermined threshold.

In at least one embodiment, the controller is configured to monitor the anode using the anode sensor. In at least one embodiment, the controller is configured to alert a user when the anode should be replaced. In at least one embodiment, the controller is configured to monitor the anode over time using the anode sensor and predict when the anode will no longer provide sufficient galvanic protection to the tank.

In at least one embodiment, the anode sensor at least partially surrounds the anode of the tank. In at least one embodiment, the anode of the tank at least partially surrounds the anode sensor. In at least one embodiment, the anode sensor includes a plurality of inductive coils. In at least one embodiment, the anode sensor includes its own processor separate from but in electrical communication with the controller.

In at least one embodiment, a system for monitoring an underground propane tank comprises a controller; a remote user interface in electronic communication with the controller; and an anode sensor coupled to an anode of the tank and coupled in communication with the controller. In at least one embodiment, the controller is configured to monitor the anode over time using the anode sensor and provide an indication, through the remote user interface, of when the anode will no longer provide sufficient galvanic protection to the tank.

In at least one embodiment, a system for monitoring underground propane tanks comprises a controller; a plurality of probes coupled in communication with the controller, wherein each probe is adapted to be disposed at least partially underground; and a moisture sensor coupled in communication with the controller.

In at least one embodiment, the system is adapted to measure a potential difference between a propane tank and soil surrounding the propane tank. In at least one embodiment, the system is adapted to measure the potential difference based on a signal from the moisture sensor. In at least one embodiment, the system is adapted to determine the moisture content of at least a portion of the soil prior to measuring or at the time of measuring the potential difference. In at least one embodiment, the system is adapted to refrain from measuring the potential difference when the soil has a moisture content below a predetermined level.

In at least one embodiment, the moisture sensor is coupled to one of the plurality of probes. In at least one embodiment, the system includes a plurality of moisture sensors and wherein each of the plurality of probes has a moisture sensor coupled thereto.

In at least one embodiment, the system includes a wireless transmitter coupled in communication with the controller. In at least one embodiment, the system includes a remote user interface in electronic communication with the controller. In at least one embodiment, the system is adapted to alert a user when an anode associated with a propane tank should be replaced. In at least one embodiment, the system is adapted to record and store measurement data in a database.

DETAILED DESCRIPTION OF THE INVENTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions can include, and likely are not limited to, compliance with system-related, business-related, government-related and other constraints, which can vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the inventions or the appended claims. The terms "including" and "such as" are illustrative and not limitative.

The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally. Unless otherwise indicated, the term "liquid(s)" as used herein includes both pure liquids and impure liquids, including but not limited to mixtures, combinations of immiscible liquids and one or more liquids mixed or otherwise combined with one or more non-liquids.

Applicants have created improved devices, systems and methods for corrosion monitoring, including but not limited to for monitoring corrosion of a metal tank disposed at least partially underground, such as a tank for holding liquid propane gas (LPG) or another substance. In at least one embodiment, monitoring corrosion of a tank can include measuring electrical potential between the tank and the ground and/or monitoring the size and/or condition of one or more sacrificial anodes associated with the tank. One or more aspects and embodiments of the present disclosure are described in more detail below with reference to the Figures.

In at least one embodiment, a system for monitoring an underground propane tank comprises a controller, a moisture sensor coupled in communication with the controller, a voltage probe coupled in communication with the controller, and an anode sensor coupled to an anode of the tank and coupled in communication with the controller. In at least one embodiment, the system further includes a remote user interface in electronic communication with the controller.

In at least one embodiment, the controller is configured to measure a moisture associated with the tank. In at least one embodiment, the voltage probe is adapted to be disposed at least partially underground. In at least one embodiment, the controller is configured to measure a potential difference between the tank and soil surrounding the tank. In at least one embodiment, the controller is configured to measure the potential difference when the moisture associated with the tank is measured to be above a predetermined threshold. In at least one embodiment, the controller is configured to refrain from measuring the potential difference when the moisture associated with the tank is measured to be below the predetermined threshold.

In at least one embodiment, the controller is configured to monitor the anode using the anode sensor. In at least one embodiment, the controller is configured to alert a user when the anode should be replaced. In at least one embodiment, the controller is configured to monitor the anode over time using the anode sensor and predict when the anode will no longer provide sufficient galvanic protection to the tank.

In at least one embodiment, the anode sensor at least partially surrounds the anode of the tank. In at least one embodiment, the anode of the tank at least partially surrounds the anode sensor. In at least one embodiment, the anode sensor includes a plurality of inductive coils. In at least one embodiment, the anode sensor includes its own processor separate from but in electrical communication with the controller.

In at least one embodiment, a system for monitoring an underground propane tank comprises a controller; a remote user interface in electronic communication with the controller; and an anode sensor coupled to an anode of the tank and coupled in communication with the controller. In at least one embodiment, the controller is configured to monitor the anode over time using the anode sensor and provide an indication, through the remote user interface, of when the anode will no longer provide sufficient galvanic protection to the tank.

In at least one embodiment, a system for monitoring underground propane tanks comprises a controller; a plurality of probes coupled in communication with the controller, wherein each probe is adapted to be disposed at least partially underground; and a moisture sensor coupled in communication with the controller.

In at least one embodiment, the system is adapted to measure a potential difference between a propane tank and soil surrounding the propane tank. In at least one embodiment, the system is adapted to measure the potential difference based on a signal from the moisture sensor. In at least one embodiment, the system is adapted to determine the moisture content of at least a portion of the soil prior to measuring or at the time of measuring the potential difference. In at least one embodiment, the system is adapted to refrain from measuring the potential difference when the soil has a moisture content below a predetermined level.

In at least one embodiment, the moisture sensor is coupled to one of the plurality of probes. In at least one embodiment, the system includes a plurality of moisture sensors and wherein each of the plurality of probes has a moisture sensor coupled thereto.

In at least one embodiment, the system includes a wireless transmitter coupled in communication with the controller. In at least one embodiment, the system includes a remote user interface in electronic communication with the controller. In at least one embodiment, the system is adapted to alert a user when an anode associated with a propane tank should be replaced. In at least one embodiment, the system is adapted to record and store measurement data in a database.

Figure 1:
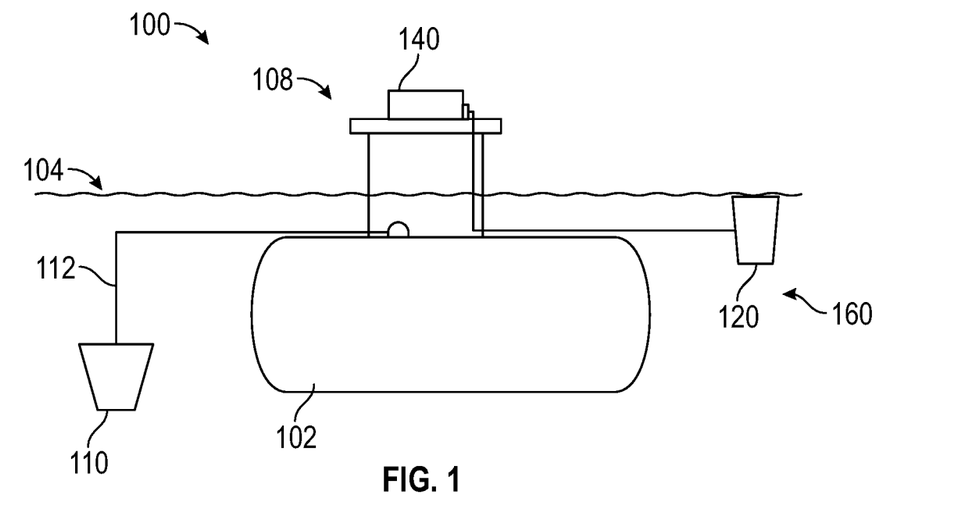
FIG. 1 is a schematic view of one of many embodiments of a corrosion monitoring system according to the disclosure.
Figure 2:
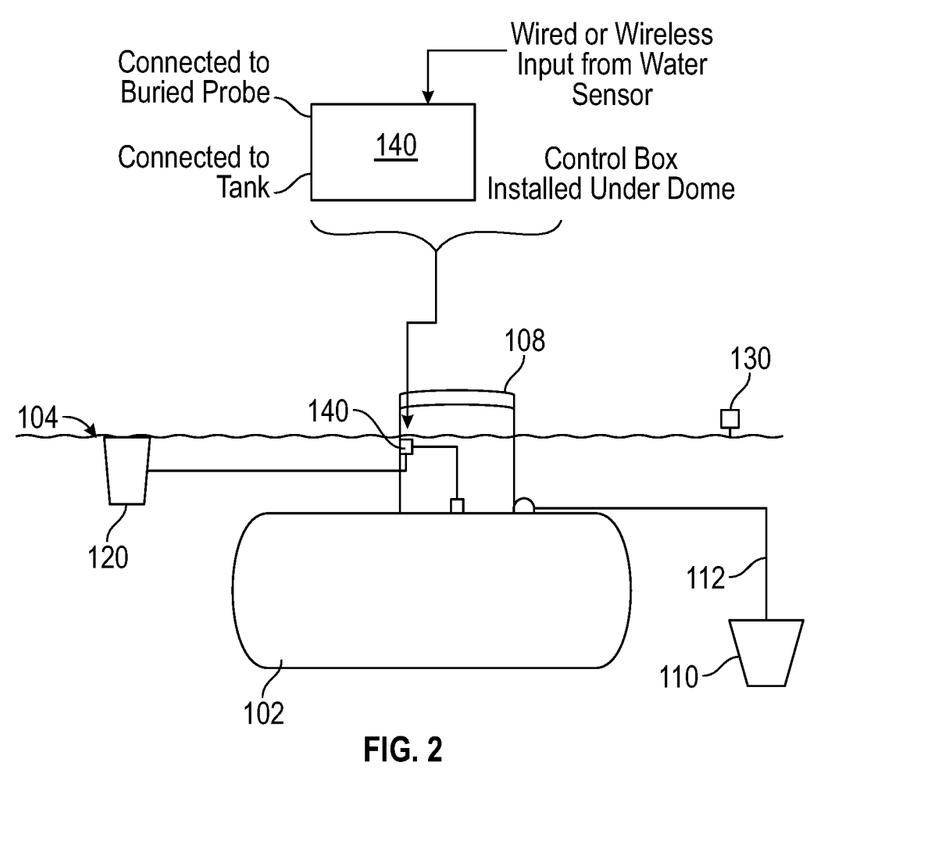
FIG. 2 is a schematic view of another of many embodiments of a corrosion monitoring system according to the disclosure.
Figure 3:
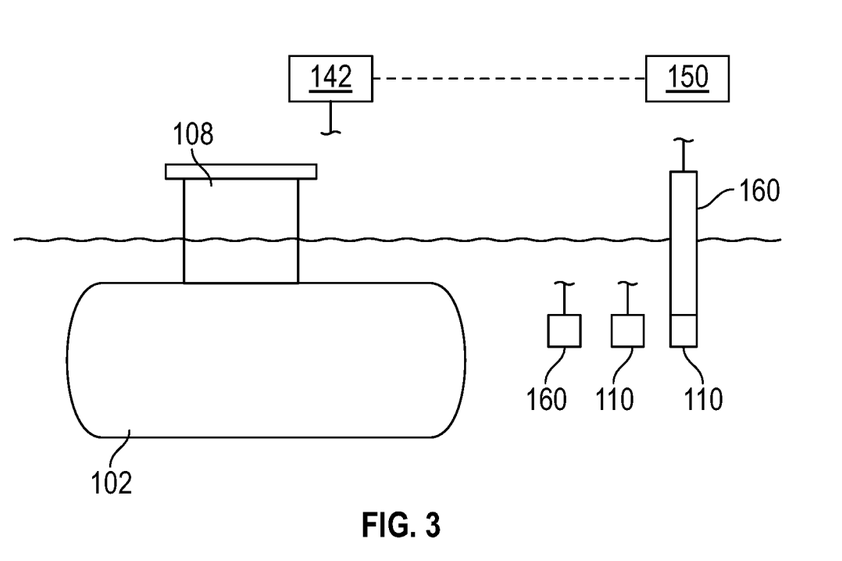
FIG. 3 is a schematic view of yet another of many embodiments of a corrosion monitoring system according to the disclosure.
Figure 4:
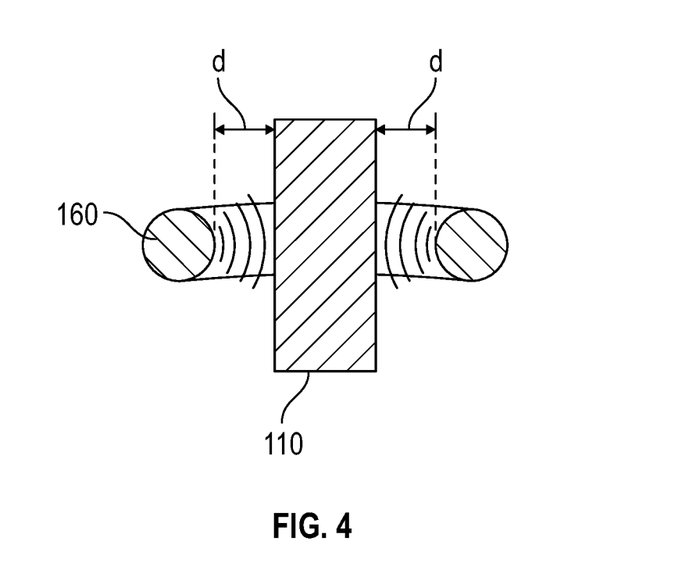
FIG. 4 is a schematic cross-sectional view of one of many embodiments of an anode sensor according to the disclosure.
Figure 5:
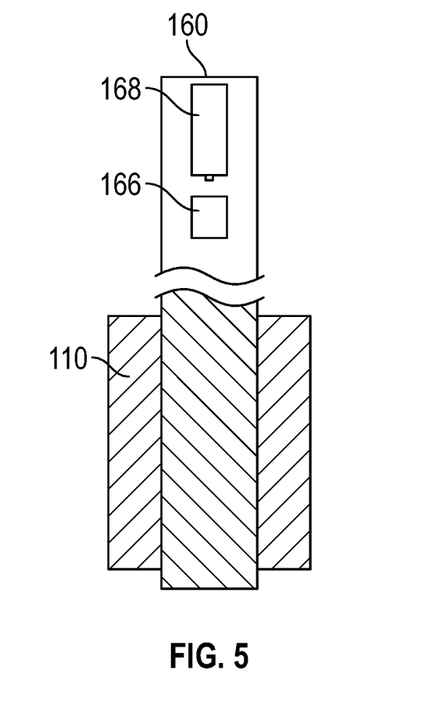
FIG. 5 is a schematic cross-sectional view of another of many embodiments of an anode sensor according to the disclosure.
Figure 6:
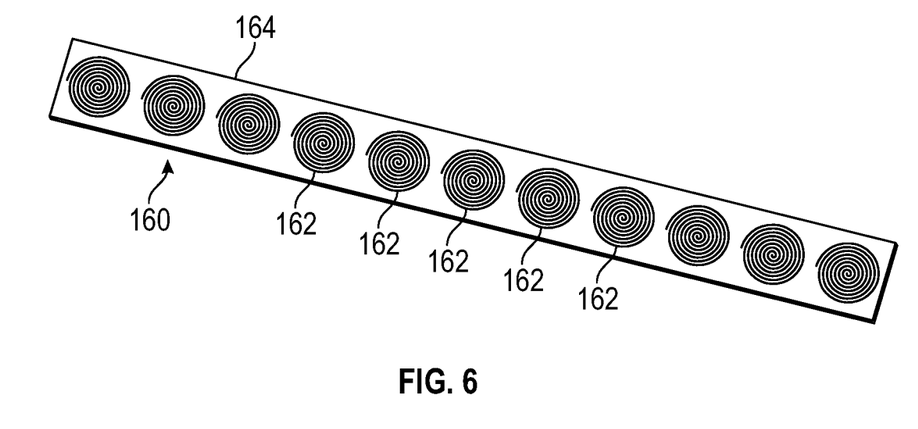
FIG. 6 is a schematic perspective view of yet another of many embodiments of an anode sensor according to the disclosure.
Figure 7:
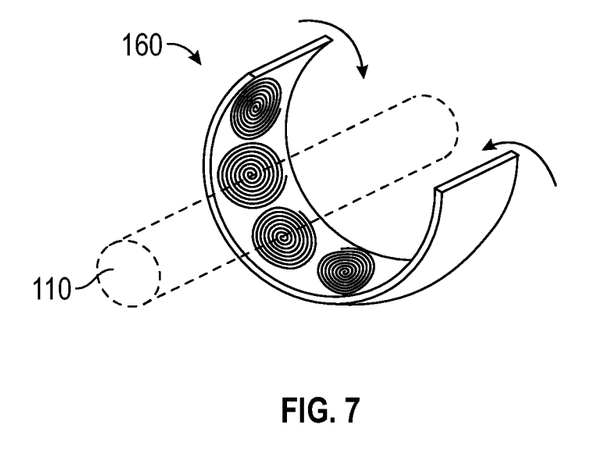
FIG. 7 is a schematic perspective view of one of many embodiments of a flexible anode sensor according to the disclosure.
Figure 8:
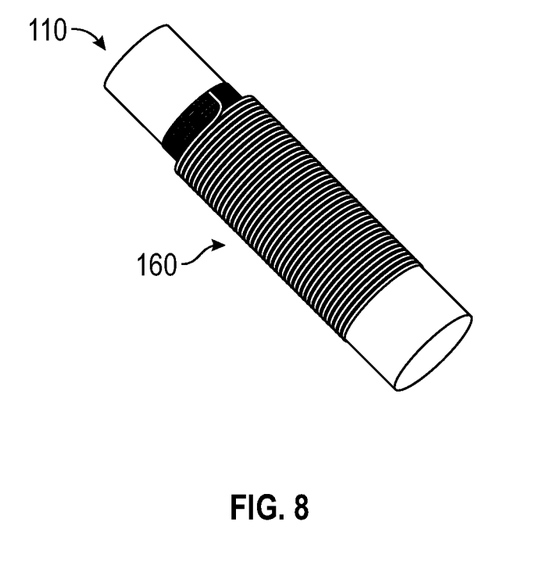
FIG. 8 is a schematic perspective view of still another of many embodiments of an anode sensor according to the disclosure.
Figure 9:
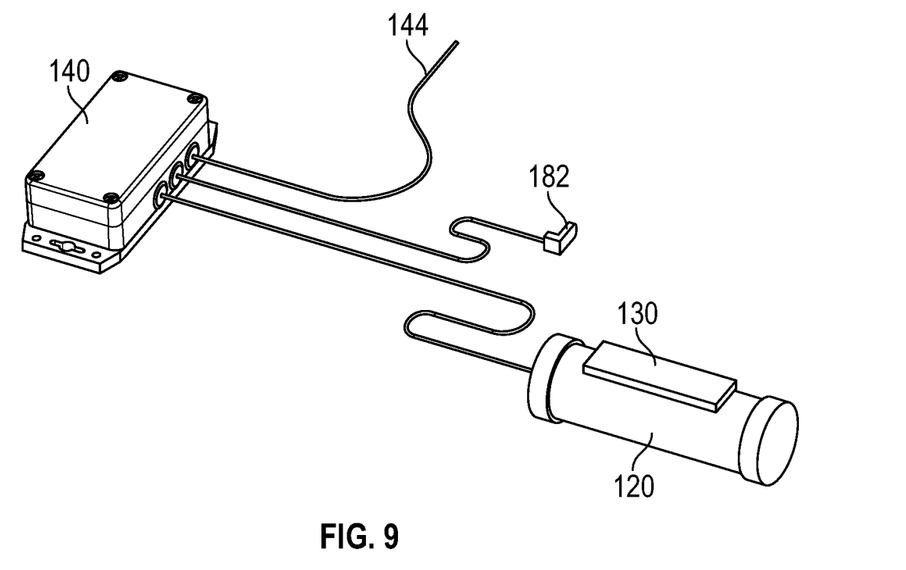
FIG. 9 is a schematic view of still another of many embodiments of a corrosion monitoring system according to the disclosure.
Figure 10:
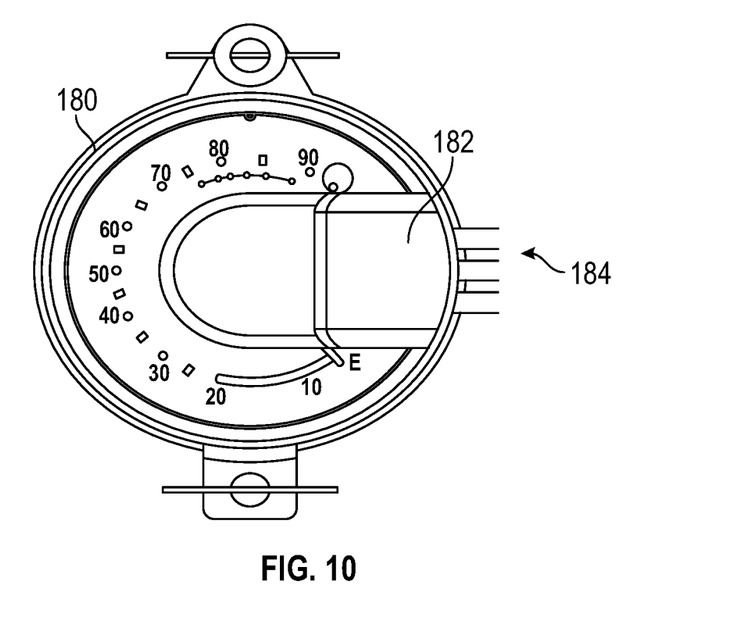
FIG. 10 is an elevational view of one of many embodiments of a level sensor according to the disclosure.
Figure 11:
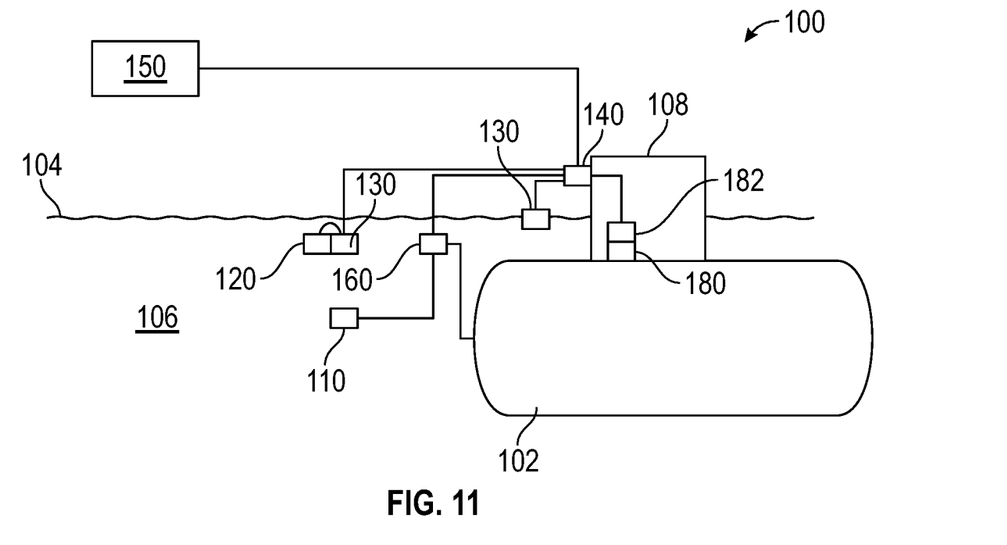
FIG. 11 is a schematic view of still another of many embodiments of a corrosion monitoring system according to the disclosure.
Figure 12:
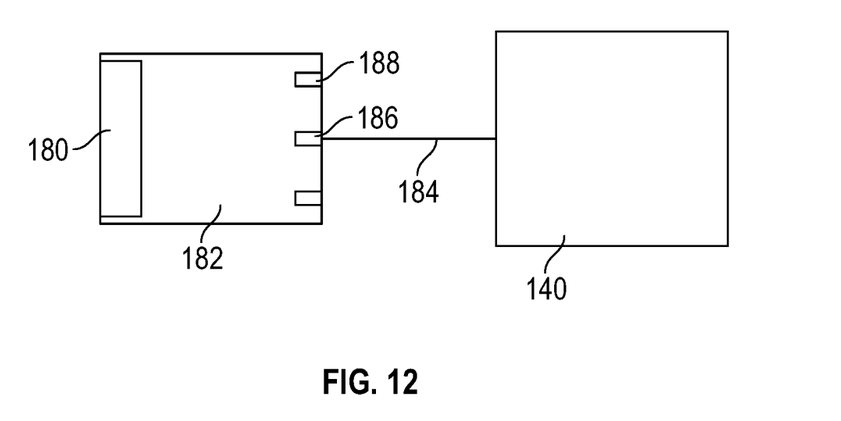
FIG. 12 is a block diagram of another of many embodiments of a level sensor according to the disclosure.

FIG. 1 is a schematic view of one of many embodiments of a corrosion monitoring system according to the disclosure. FIG. 2 is a schematic view of another of many embodiments of a corrosion monitoring system according to the disclosure. FIG. 3 is a schematic view of yet another of many embodiments of a corrosion monitoring system according to the disclosure. FIG. 4 is a schematic cross-sectional view of one of many embodiments of an anode sensor according to the disclosure. FIG. 5 is a schematic cross-sectional view of another of many embodiments of an anode sensor according to the disclosure. FIG. 6 is a schematic perspective view of yet another of many embodiments of an anode sensor according to the disclosure. FIG. 7 is a schematic perspective view of one of many embodiments of a flexible anode sensor according to the disclosure. FIG. 8 is a schematic perspective view of still another of many embodiments of an anode sensor according to the disclosure. FIG. 9 is a schematic view of still another of many embodiments of a corrosion monitoring system according to the disclosure. FIG. 10 is an elevational view of one of many embodiments of a level sensor according to the disclosure. FIG. 11 is a schematic view of still another of many embodiments of a corrosion monitoring system according to the disclosure. FIG. 12 is a block diagram of another of many embodiments of a level sensor according to the disclosure. FIGS. 1-12 will be described in conjunction with one another.

In at least one embodiment, a system according to the disclosure can be configured to monitor tank corrosion, which can include without limitation at least one of measuring, obtaining, estimating, calculating, observing, reading, transmitting, receiving, displaying, gauging, evaluating, judging, determining and assessing one or more levels or indicators of tank corrosion, whether at one time, multiple times and/or over a period(s) of time, separately or in combination, in whole or in part. For example, a system according to the disclosure can be or include a monitoring system disposed at least partially at the tank installation or tank location and configured to monitor at least one of (a) the potential difference between the tank and the soil and (b) the size and/or other condition of one or more sacrificial anodes associated with the tank. A system according to the disclosure can include one or more components installed at a tank location temporarily, permanently or otherwise as desired or required for an implementation of the disclosure. Similarly, measurements and other functions performed by a system according to the disclosure can be carried out continuously, non-continuously, periodically, sporadically, manually, automatically or otherwise as desired or required for an implementation of the disclosure.

In at least one embodiment, a monitoring system 100 (including one or more components thereof) can be placed at a tank installation and configured to monitor the potential difference between a tank 102 installed at least partially below a surface 104 and the surrounding soil 106 on a continuous or other basis. The system 100 can collect measured (and/or other) data over time, and using wireless or other communication technology, can store the data in one or more storage media (e.g., a remote storage location such as cloud storage). The system 100 can allow for data analysis over time, can provide documented proof of testing, and can reduce or eliminate user and/or weather-related variations associated with manual measurements. In addition, in at least one embodiment, the system 100 can include a water sensing system configured to indicate or otherwise determine whether soil conditions are appropriate for taking one or more measurements.

In at least one embodiment, a monitoring system 100 can include one or more controllers 140, which can be housed in one or more control boxes, one or more test probes 120 installed around the tank 102 and in wired or other communication with a controller 140, and one or more water or moisture sensors 130 for detecting when the ground 106 is wet or when (and/or whether) the moisture content of the soil 106 is appropriate for measuring the electrical potential difference between the tank 102 and the soil 106. In at least one embodiment, the system 100 can include or otherwise have access to one or more of a cloud (or other) database for storing date and a web-based user interface for allowing a user to monitor, view, control or otherwise access aspects of the system 100 and/or of data obtained via the system 100.

In at least one embodiment, one or more water/moisture sensors 130 can be a key aspect of a monitoring system 100 according to the disclosure. When soil moisture is too low, the soil 106 may not act as an effective electrolytic solution. So, when potential measurements are taken with low moisture, the measured voltage may not be accurate or correct. In fact, when taking manual measurements, procedure dictates that the ground 106 around the tank 102 and test probes 120 should be wetted first. By including one or more water sensors 130, the system 100 has an indicator that conditions are favorable (or not favorable) for proper measurement. The water/moisture sensor 130 can be or include one or more stand-alone sensors 130 installed in the ground 106 near the tank 102 and which communicate with the control box 140 via wireless communication means. Alternatively, or collectively, the water/moisture sensor 130 can be or include one or more sensors 130 installed in the ground 106 near the tank 102 and which communicate with the control box 140 via wired communication means. One or more aspects of a system 100 according to the disclosure can incorporate any wired or wireless communication means required or desired according to an implementation of the disclosure, including but not limited to Bluetooth, Wi-Fi, cellular, or other wireless communications technology, whether separately or in combination with one another.

In at least one embodiment, one or more water/moisture sensors 130 can be integrated into one or more of the buried test probes 120, which can provide for improved feedback in some implementations because the moisture content of the soil 106 at each probe 120 is being measured. In at least one embodiment, one or more water/moisture (or humidity) sensors 130 can be integrated into or otherwise coupled to the control box 140 and configured to continuously or otherwise measure the relative humidity of the air and/or rainfall to indicate or confirm favorable (or unfavorable) conditions for one or more measurements.

Wireless communication between the control box 140 and the cloud database and/or user interface 150 can be achieved by many possible protocols or combinations of protocols. In a typical embodiment, the control box 140 can have an integrated wireless technology such as a cellular that communicates directly to the internet via cellular service. As another example, the control box 140 can use a low energy wireless like BLE that communicates to a secondary gateway device 142 that receives the BLE data and then transfers that data via another wireless protocol, such as LORA or WIFI, to the web-based database. An advantage of the separate gateway 142 can include managing the power consumption of the system 100. The gateway 142 can be placed out of the hazardous tank location, and thus can be powered via wall outlet or similar, without needing electrical certification for a hazardous area.

In at least one embodiment, moisture level, voltage and temperature can be recorded periodically by the control box 140, which can be or include any period(s) of time according to an implementation of the disclosure. The data collected can be periodically uploaded to a cloud database. Using a web browser interface, the data can be analyzed and processed by one or more users. In at least one embodiment, the control box 140 can be connected to the internet and can periodically or otherwise check online weather reports to assess or know when rain is expected or likely in the geographical area of the corresponding tank location. When the proper rain conditions are present for anticipated soil moisture favorable to accurate measurements, a signal can be sent to the measurement circuit telling the system 100 to perform a measurement and could supplement or prevent the need for any physical humidity sensors. As another example, in an embodiment wherein a separate gateway is used, the gateway 142 can be connected to the internet and can periodically check online weather reports to know when rain is likely or present in the area. When the proper rain conditions are present, the gateway 142 could then send a wired or wireless signal to a separate measurement device located near the tank 102, telling it to perform a measurement and prevent the need for any physical humidity sensors. One advantage of such an embodiment is that the measuring device near the tank 102 and anode 110 can use lower power wireless technologies (such as Bluetooth) and avoid the need to integrate higher power or higher cost internet connected technologies.

In any embodiment or implementation, it is possible that some measurements occur when the moisture level is not ideal and thus bad voltage readings can be observed or recorded. The system 100 can be configured to track any number of previous measurements to apply filters to detect which reading(s) is the best to use and which to reject. For example, a median filter can be applied to select the median measurement among the prior, e.g., ten (or other number, which can be or include any number) samples where the moisture sensor or online weather forecast indicated a strong chance of rain or an actual rain event. As another example, filtering can be further enhanced by considering the online weather predictions and using the reported chance of rain as a factor in the filtering and consideration of the ideal measurement selection. As yet a further example, the system 100 can be configured to send a signal or notification to the cloud whenever moisture has not been detected for an extended or other period of time, or for any other reason when a sample has not been measured for an extended or other period. Such a period can be chosen or configured as desired according to an implementation of the disclosure and can indicate to an operator that a manual visit and check should be performed on the respective tank 102 and anode 110.

As described previously, the common method in the industry for monitoring tank corrosion and the sacrificial anode 110 is to manually measure the electrical potential using a "voltmeter" between tank 102 and ground 106. This method further calls for an operator to moisten the ground 106 with water before taking the measurement. In the case of one or more embodiments of the system 100 described above, a moisture sensor 130 and/or weather data can be utilized to identify an acceptable time to measure potential (e.g., after a rain event) or, for instance, to determine which data may be the most reliable within a data set of measurements. However, in at least some instances, regular or periodic measurements may not be possible or available due to prolonged periods of dry climate, and the possibility of no reliable measurements can exist in cases of particularly dry climates or implementations. Further, the sacrificial anodes 110 used commonly in the industry can be either a cylindrical rod, or else a bag containing smaller blocks of the anode material (e.g., magnesium or zinc). Accordingly, in at least one embodiment, a system 100 of the present disclosure can be configured for monitoring tank corrosion in a manner that does not depend on (or does not fully depend on) potential measurements between the tank 102 and ground 106. More specifically, whether separately from or in combination with potential measurement, systems 100 of the present disclosure can be configured for monitoring one or more attributes, such as size and condition, of the sacrificial anode(s) 110, rather than, for instance, assuming its presence and the level of corrosion using solely a voltage measurement.

In at least one embodiment, a system 100 according to the disclosure can include one or more anode sensors 160 for monitoring one or more attributes of one or more sacrificial anode(s) 110 of a tank installation, such as size and/or one or more other conditions of such anode(s) 110. For instance, an anode sensor 160 can be or include an inductive sensor. As will be appreciated by a person of ordinary skill in the art having the benefits of the present disclosure, an inductive sensor is generally a device that uses the principal of electromagnetic inductance to detect or measure the distance of an object from the sensor. Such sensors can be especially good at detecting metal objects (such as magnesium or zinc) and will generally not "see" water, moisture and other non-metallic objects. An inductive sensor can generally include an electrical coil of wire or "inductive loop" 162 and when alternating electrical current is driven through it, a magnetic field is created. As a metallic object gets closer to the inductive loop 162, it will oppose the generated magnetic field, which will cause an electrical disturbance that can be measured to deduce the distance or presence of the object. An inductive sensor is one of many embodiments of an anode sensor 160 that can be utilized with systems 100 of the present disclosure and other anode sensors 160 are possible, whether now known or future developed.

In at least one embodiment, a system 100 according to the disclosure can include one or more anode sensors 160 configured for physical monitoring of one or more sacrificial anodes 110 (see, e.g., FIGS. 3-8). An anode sensor 160 can be adapted to monitor a single anode or multiple anodes 110. In at least one embodiment, an anode sensor 160 can be or include one or more at least partially annular bodies disposed about or otherwise in sensing communication with an anode rod or anode bag in the shape of a ring or doughnut (e.g., a torus or similar). The anode sensor body can have one or more inductive loops 162 around its circumference or otherwise that "point" inwardly towards the center of the body and are disposed in sensing proximity to the sacrificial anode material. One or more inductive sensors can include a coil of wire able to generate a magnetic field when current is applied and can operate as an inductive proximity sensor configured to sense the proximity of anode material relative to the sensor or coil 162. In at least one embodiment, one or more coils of wire 162 can be etched onto or otherwise incorporated into a printed circuit board (PCB) 164.

In at least one embodiment, an anode sensor 160 according to the disclosure can include one or more inductive loops 162 configured to direct a magnetic field radially inwardly towards anode material disposed at least partially within or through an annular portion of the sensor or sensor body. When the sensor body is placed around, e.g., a sacrificial anode bag, rod, or other sacrificial anode structure, the inductive loops 162 can measure the presence of the metallic anode material therein. As the anode material corrodes and disappears over time, the inductive loops 162 can detect the change in (and/or lack of) the anode material and the anode sensor/system 100 can be configured to estimate or determine how much of (or whether) the sacrificial anode 110 is remaining (or, e.g., how much of the sacrificial anode material has corroded away). The anode sensor 160 can include or can be coupled in electrical communication with a controller or processing unit 166 that can be either buried with the anode 110 or placed above the surface 104 of the ground 106 (or both). The controller or processing unit (aka control box) 166 can be or include any of the others disclosed herein or, in at least one embodiment, can be or include one or more separate or additional controllers.

In at least one embodiment, an anode sensor 160 according to the disclosure can include corresponding electronic circuitry integrated into it and/or a controller, such as a microcontroller, 166 able to perform the inductive loop measurements. This same (or different) circuitry can contain wireless communication means (e.g., Wi-Fi, Bluetooth, cellular) capable of transmitting measured anode levels or data to one or more other components of the system 100, such as a control box or, as another example, directly or indirectly to the internet for storing and processing. In at least one embodiment, an anode sensor 160 can have one or more ports (whether for temporary or permanent connections) for wired communication with one or more other system components. For instance, an anode sensor 160 can include an antenna connector or port and the system 100 can include an antenna or other gateway 142 placed above ground to help enhance the range of any wireless transmissions to and/or from the system or components thereof.

In at least one embodiment, a ring-shaped anode sensor can be built using printed circuit board (PCB) technology. One or more inductive loop(s) 162 can be printed on the circuit board 164. The circuit board 164 and included micro-processing unit 166 can also contain any other features of the embodiments contained herein (such as microcontrollers, logging of sensor measurements, capabilities for wired or wireless transmission of the measured signals, etc.). In at least one embodiment, the circuit board 166 used on or by the anode sensor 160 can utilize "flex" circuit board technologies, which can allow the circuit board 162 to be bent around a radius of (or in some cases, to constitute) a ring-shaped or otherwise shaped body or substrate of the anode sensor 160. In at least one embodiment, the circuit board 166 and/or anode sensor 160 can contain one or more batteries 168 so that the sensor 160 and its circuitry can be powered without the presence of any other power sources.

With continuing reference to the Figures and specific reference to FIGS. 6-7, exemplary embodiments of an anode sensor 160 comprising a substrate are shown. For instance, as noted above, the substrate can be or include one or more PCB's 164, such as a more conventional rigid PCB or a flexible PCB for allowing the sensor to be shaped or otherwise arranged in accordance with an implementation of the disclosure. As illustrated in FIG. 6, in at least one embodiment, the anode sensor 160 can comprise a rigid PCB 164 having one or more inductive coils or spirals 162 coupled thereto (which can include being partially or wholly printed thereon) and configured to be disposed in sensing communication with one or more anodes 110. For example, the coils 162 can be configured to sense in the direction of their Z-axes (as shown in the illustrative orientation of FIG. 6) or otherwise and all or a portion of the PCB 164 can be disposed adjacently or otherwise relative to an anode or anode material 110 for monitoring corrosion of the anode 110 over time. For instance, in at least one embodiment, the PCB 164 can be disposed next to an elongated or rod-shaped anode 110 so that one or more of the inductive coils 162 is in sensing communication with the anode 110. As another example, all or a portion of the PCB 164 can be disposed within an anode bag so that one or more of the inductive coils 162 is in sensing communication with the anode material 110 in the bag. As illustrated in FIG. 7, in at least one embodiment, the anode sensor 160 can comprise a flexible PCB 164 configured to be bent or otherwise manipulated into a shape suitable for disposing one or more of the inductive coils 162 in sensing communication with one or more anodes 110 as desired or required according to an implementation of the disclosure. For example, the PCB 164 can be formed into a ring and disposed about all or a portion of an anode 110. As other examples, the PCB 164 can be formed into a U-shape, C-shape, S-shape or any other shape according to an implementation of the disclosure. As yet another example, the PCB 164 can be configured for elastically (or plastically) deforming onto an outer surface of an anode 110. For instance, the PCB 164 can be configured in a "slap bracelet" like manner or otherwise configured to wrap wholly or partially around an anode 110 for sensing operations, which can but need not include the use of fasteners or other couplers for holding the anode sensor 160 in place relative to the anode 110. While PCB's are illustrated herein for purposes of example and explanation, other substrates are also possible. For instance, one or more inductive coils 162 can be coupled to or disposed within another type of rigid or flexible substrate, such as by way of being coupled to an outer surface thereof, disposed between two layers thereof, or otherwise.

With continuing reference to the Figures and specific reference to FIGS. 8, another exemplary embodiment of an anode sensor 160 according to the disclosure is shown. As noted elsewhere in this disclosure, an anode 110 can be or include an elongated or rod-like anode body in at least some cases. In at least one embodiment, an anode sensor 160 according to the disclosure can include one or more inductive coils 162 (or other sensor types, if applicable) wrapped around or otherwise coupled in sensing communication with the anode body as illustrated for exemplary purposes in FIG. 8. In other words, in at least one embodiment, an anode 110 or a portion thereof can be the "core" of an inductive anode sensor 160 according to the disclosure and one or more inductive coils 162 can be wrapped around the core for sensing communication therewith. The anode 110 having a measurable magnetic permeability, the inductance will change as the anode "core" deteriorates and such changes can be measured and monitored over time for monitoring the state of the anode 110.

While one or more embodiments of an anode sensor 160 according to the disclosure can be at least partially annular, arcuate, curved or ring-shaped, that need not be the case and alternatively, or collectively, one or more anode sensors 160 or portions thereof can be or include another shape, which can be any shape according to an implementation of the disclosure. For example, an anode sensor 160 can be or include a body or sensing structure of any physical shape capable of being located in sensing proximity to anode material 110 (e.g., magnesium or zinc) such that the inductive loop(s) 162 (or other sensing structure, such as those described elsewhere herein) can sensingly communicate with at least a portion of the anode or anode material 110 being monitored. Further, while an anode sensor 160 can be adapted for being disposed at least partially about an anode 110 and generally sensing in a radially inward direction, this need not be the case and other configurations are possible, separately or in combination, in whole or in part. For instance, in at least one embodiment, an anode sensor 16 can be configured to be disposed at least partially within an anode 110 or anode bag and to sense the state of the anode or anode material 110 in a radially outward or other direction, which can be or include any direction or directions according to an implementation of the disclosure.

In some cases, sacrificial anodes 110 can be built in a rod-like fashion such that the anode material is a solid, elongated cylindrical shape (or the like). In such cases, an anode sensor 160 according to the disclosure can be configured to monitor the anode 110 from the outside in. However, in other cases, the center (or another portion) of the anode "rod" can be vacated and an anode sensor 160 according to the disclosure can be configured to be disposed at least partially within the anode or anode material 110 and to monitor the anode 110 from the inside out. As another example, an anode sensor 160 according to the disclosure can be at least partially tubular or pipe-like. In such an embodiment, which is but one of many, an anode 110 can be disposed at least partially within the anode sensor 160 for monitoring or, for instance, an anode sensor 160 can be disposed at least partially within the anode 110 for monitoring. In at least one embodiment, a system 100 according to the disclosure can include a combination anode 110 and anode sensor 160 component. For example, the anode material 110 and anode sensor 160 can be preassembled (or configured for assembly in the field) and made/sold as a unit for installation at a tank site.

In at least one embodiment, an anode sensor 160 according to the disclosure can be or include an elongated rod- or pipe-like structure having one end disposed underground in sensing communication with anode material 110 and another end disposed aboveground, such as for facilitating access to one or more components of the sensor 160 or system 10 or, for instance, for allowing the routing of wires 112 to/from the anode 110 and/or the anode sensor 110 for signal transmission, power, or potential. In at least one embodiment, an anode sensor 160 can have an end or other portion disposed above the surface 104 of the ground 106 with a cover or cap and an antenna can be coupled to or disposed within the aboveground portion for facilitating wireless transmission of date to and/or from the sensor 160. In at least one embodiment, an anode sensor 160 can have a body configured to house one or more other system components, such as one or more controllers, receivers, transmitters, batteries, junction boxes, or other components for supporting sensing operations, whether aboveground, underground or both. In at least one embodiment, an anode sensor body can be at least partially tubular and can be sized and configured for holding one or more commercially available cylindrical batteries (e.g., AA, AAA, C, D, CR123, etc.) 168 for providing power to the sensor and/or other system components.

In at least one embodiment, instead of or in addition to the inductive proximity or inductive loop sensor types described above, an anode sensor 160 according to the disclosure can be or include one or more other types of sensors for monitoring the state of an anode or anode material 110, such as capacitive sensors or capacitive proximity or distance detection sensors configured to be placed in sensing proximity to the anode material 110 and used to detect the presence, or lack thereof, of the anode material 110. Any electrical capacitive sensing or proximity techniques can potentially be utilized according to an implementation of the disclosure, whether such techniques are now known or later developed. As other examples, an anode sensor 160 according to the disclosure can be or include an infrared sensor, an optical sensor or another sensor type, such as an ultrasonic sensor, configured to monitor the state of an anode or anode material 110, which can be or include any type of sensor capable of monitoring the size, presence or other state of an anode or anode material 110 in accordance with the disclosures and teachings hereof. In at least one embodiment, an anode sensor 160 according to the disclosure can be configured to detect the proximity of an anode 110 at a plurality of instances over time and the system 100 can be configured to determine the change in proximity over time for indicating whether the anode 110 needs to be replaced or, for instance, how much of the anode 110 remains or has corrodes away. The system can be configured to record or report measurement data over any period(s) or increment(s) of time according to an implementation of the disclosure. As another example, in at least one embodiment, the system can be configured to monitor the proximity or size of an anode 110 periodically or continuously and to alert a user or operator in the event the measurement data indicates a present or impending need for anode replacement or physical inspection.

An anode sensor or anode sensing system according to the disclosure can be configured to monitor any one or more attributes, characteristics, properties or other states of one or more anodes 110 as needed or desired according to an implementation of the disclosure. Further, any of such states or variables can be monitored separately or in combination with one another, in whole or in part, and simultaneously or at different times. Additionally, the monitored or measured data can be utilized in any one or more of a number of ways. For instance, the data can be utilized to reflect or estimate the extent of tank corrosion and/or anode corrosion, whether an anode(s) 110 is present, whether an anode(s) 110 of sufficient quantity and/or quality is present, the need for tank replacement, the need for anode replacement, the need for physical inspection, the timing of any of the foregoing, or other factors, whether separately or in combination with one another.

In at least one embodiment, a system according to the disclosure can be configured to monitor the amount of anode material 110 present at the time of one or more measurements, such as in terms of volume, mass, weight, size, dimension, density, porosity, area, surface area or another physical characteristic of such material. The monitoring can include measurements from one or more anode sensors 160, including based on or in consideration of variables such as material type, magnetic permeability, inductance, proximity and resistance, among others. The system can be configured to determine or estimate how much of an anode 110 is remaining (or, e.g., how much of an anode has corroded away) based on one or more measurements and, in at least one embodiment, to display or otherwise convey that information to a user. In at least one embodiment, the system can be configured to trigger a need for replacement or estimate a time for replacement based on, e.g., a percentage of anode material present or absent versus one or more other measurements or, as another example, versus the amount of anode material present at the time a particular anode is in new condition, which can be or include any anode 110 according to an implementation of the disclosure. The amount or percentage of anode material indicative of a need for (or, e.g., no need for) anode replacement or maintenance can be or include any amount or percentage according to an implementation of the disclosure, including an amount from 0% to 100%. As another example, the system can be configured to assess anode condition based on an equivalent or corresponding voltage drop for the same or a similar amount or change in amount of anode material.

For example, as discussed above, an anode sensor or anode sensing system 160 according to the disclosure can be configured to monitor a physical size of the anode 110, or a quantity of anode material remaining. In at least one embodiment, an anode sensor 160 measures an electrical characteristic of the anode 110, such as its voltage relative to the tank 102 or an amount and/or direction of current flowing between the tank 120 and the anode 110.

Passive cathodic protection, such as that which might be used on a propane tank 102, electrically couples the sacrificial anode 110 to the tank 102, such that the resulting voltage potential forces current flow between the anode 110 and the tank 102, such as current flow from the anode 110 to the tank 102 or the reverse, thereby protecting the tank 102 from galvanic corrosion. Impressed current systems achieve the same using a dc battery to force the current in the same direction instead of the inherent potential difference between two dissimilar metals in the passive system.

Therefore, in at least one embodiment, the anode sensor 160 measures a current measurement between the tank 102 and anode 110 to monitor anode life. In this embodiment, the anode wire 112 that normally connects to a threaded lug on the tank 102, can be connected to, or through, the anode sensor 160 or the controller 140, then another wire from the anode sensor 160 or the controller 140 to the lug tank. When that current gets below a threshold, such as a predetermined threshold, the controller 140 can determine that the anode 110 is ineffective, i.e., providing insufficient galvanic protection to the tank 102, and needs replacement. In at least one embodiment, the anode sensor 160 measures the current measurement between the tank 102 and anode 110 continuously. In at least one embodiment, the controller 140 can monitor the anode 110 over time and predict when the anode 110 will be ineffective and need replacement. Such predictions can be shared with a user, such as a homeowner and/or service technician, through the user interface 150 and/or other means, such as a warning light system with red, yellow, and green lights to indicate the status of the anode 110.

In at least one embodiment, the system can be configured to provide a user with a continuous or periodic indication of how much anode 110 or anode life remains so that the user can determine or forecast the timing of replacement or physical inspection. Such data can be presented graphically or otherwise via a user interface, such as a webpage, app or other interface. A system according to the disclosure can be configured to take into consideration or account for any type or number of variables according to an implementation of the disclosure, including those mentioned above and elsewhere herein, among others, such as tank size, tank material, tank age, tank surface area, moisture levels or moisture content, and/or soil condition. Further, in at least one embodiment, a system according to the disclosure can be configured to develop, estimate or implement one or more correlations over time, such as for determining or estimating an amount or other condition of an anode 110 indicative of actual or impending ineffectiveness, which can and likely will vary from implementation to implementation of the disclosure based on differences in one or more of the variables mentioned above. For instance, variables such as soil moisture content, average soil moisture, anode surface area and tank surface area, in at least some cases, can have meaningful effects on the determination of what constitutes an effective (or ineffective) anode or set of anodes 110 for a given tank installation, and a system according to the disclosure can optionally be configured for taking one or more of such variables into account during system operations in order to help ensure accurate monitoring of the tank installation. As another example, in at least one embodiment, a system 100 according to the disclosure can be configured to develop, estimate or implement one or more correlations between voltage/potential and one or more anode characteristics (e.g., size, surface area or others mentioned above), which in at least some cases can include comparing or correlating one or more anode characteristics to industry known voltage guidelines for facilitating a determination or estimation of the integrity or life of the system 100 or a component thereof (e.g., an anode 110 or tank 102).

In at least one embodiment, a system 100 for monitoring corrosion of a tank 102, such as a metal tank disposed at least partially under a surface 104 of the ground 106, and/or at least partially underground, can include one or more controllers 140 and one or more anode sensors 160 for monitoring the status or size of one or more sacrificial anodes 110 associated with the tank 102. In at least one embodiment, the controller(s) 140 can be mounted to a hood 108 or another compartment associated with the tank 102 that can extend to or beyond the surface 104 of the ground 106. In at least one embodiment, the controller 140 can be grounded to the tank 102 directly or through a grounding strap 144. In at least one embodiment, such as where the anode sensor 160 measures the current through and/or voltage of the anode 110, the anode 110 can be connected directly to the controller 140 or the anode sensor 160, which can then be connected to the controller 140.

In at least one embodiment, a system 100 for monitoring corrosion of a tank 102 can include one or more test probes 120 for measuring a voltage potential between the tank 102 and surrounding soil 106. In at least one embodiment, the system 100 includes one test probe 120. In at least one embodiment, the system 100 includes four test probes 120. In at least one embodiment, the system 100 includes between one and four test probes 120. In at least one embodiment, the test probe(s) 120 can be wired to the controller 140. In at least one embodiment, the system 100 can include one or more moisture sensors 130 In at least one embodiment, the moisture sensor(s) 130 can be wired to the controller 140 directly and/or independently of the test probe 120. In at least one embodiment, the moisture sensors 130 can be wired to the controller 140 through the test probe 120 and/or can be co-located with, or even integrated into, the test probe 120.

In at least one embodiment, a system 100 for monitoring of a tank 102 can include one or more level sensors 182 to monitor a level, or quantity of, gas and/or fluid within the tank 102. In at least one embodiment, the level sensor 182 can directly determine the level, or quantity of, gas and/or fluid in the tank 102. In at least one embodiment, the level sensor 182 can indirectly determine the level, or quantity of, gas and/or fluid in the tank 102 by monitoring a level gauge 180 or other drive that determines the level, or quantity of, gas and/or fluid in the tank 102. In at least one embodiment, the level sensor 182 can be connected to the controller 140 by one or more conductors, such as a cable, 184.

In at least one embodiment, the level sensor 182 can include one or more camera(s) 186 that images an indicator on the level gauge 180. In at least one embodiment, the image can be decoded by the controller 140 to determine an orientation of the indicator on the level gauge 180, and thus the level, or quantity of, gas and/or fluid in the tank 102. In at least one embodiment, the level sensor 182 can include one or more light emitting diodes(s), or LED(s), 188 to illuminate the level gauge 180 and/or indicator on the level gauge 180. In at least one embodiment, the level sensor 182 can fit onto, or over, the level gauge 180. In at least one embodiment, the level sensor 182 can include a hall effect sensor that reads the level gauge 180, such as those produced by Rochester Gauges, LLC. In at least one embodiment, the controller 140 can provide the level, or quantity of, gas and/or fluid in the tank 102 to the user interface 150.

In at least one embodiment, a system 100 for monitoring corrosion of a tank 102, such as a metal tank disposed at least partially in contact with soil 106 and/or at least partially underground, can include one or more controllers 140 and one or more anode sensors 160 for monitoring the state or size of one or more sacrificial anodes 110 associated with a tank 102. In at least one embodiment, one or more anode sensors 160 can be or include an inductive sensor configured to sense the extent of corrosion of a metal anode, e.g., by sensing the distance between the sensor 160 (including a portion thereof) and the anode 110 (including a portion thereof). In at least one embodiment, an anode sensor 160 can be configured to determine whether an anode 110 is present or, as another example, whether an anode 110 of sufficient size is present, which can be any size according to an implementation of the disclosure (e.g., depending on the type of anode utilized for the implementation). In at least one embodiment, an anode sensor 160 can be configured to monitor an anode 110 from the inside out. In at least one embodiment, an anode sensor 160 can be configured to monitor an anode 110 from the outside in. In at least one embodiment, an anode sensor 160 can be coupled in wired or wireless communication with a controller 140 and/or an antenna 142. In at least one embodiment, one or more anode sensors 160 can be or include a capacitive sensor configured to sense the extent of corrosion of a metal anode 110. In at least one embodiment, one or more anode sensors 160 can include one end configured to be disposed under the surface 104 of the ground 106 in sensing communication with anode material 110 and another end configured to be disposed above the surface 104 of the ground 106. In at least one embodiment, an anode sensor 160 can be or include at least one of an inductive sensor, an infrared sensor, an optical sensor, an ultrasonic sensor and a combination thereof.

In at least one embodiment, an anode sensor 160 can be at least partially annular, whether continuous or segmented, and can be configured to be disposed at least partially around or otherwise in sensing communication with one or more anodes or anode material(s) 110. An anode sensor 160 can be or include an at least partially annular body having one or more inductive coils 162 disposed thereon for generating a magnetic field adapted to sense the proximity of anode material 110. An anode sensor 160 can be or include a PCB 164 comprising one or more inductive wires or coils 162.

In at least one embodiment, a system 100 can include any one or more of the following components, whether separately or in combination with one or more anode sensors 160: one or more probes 120 coupled in communication with a controller 140, such as probes adapted to be disposed at least partially underground to measure potential difference between a tank 102 and soil 106 surrounding the tank 102; one or more moisture or water sensors 130 in communication with the controller 140; wired or wireless communication equipment; gateways 142; user interfaces 150, whether web-based or otherwise.

In at least one embodiment, a system 100 for monitoring an underground propane tank 102 comprises a controller 140, a moisture sensor 130 coupled in communication with the controller 140, a voltage probe 120 coupled in communication with the controller 140, and an anode sensor 160 coupled to an anode 110 of the tank 102 and coupled in communication with the controller 140. In at least one embodiment, the system 100 further includes a remote user interface 150 in electronic communication with the controller 140.

In at least one embodiment, the controller 140 is configured to measure a moisture associated with the tank 102. In at least one embodiment, the voltage probe 120 is adapted to be disposed at least partially underground. In at least one embodiment, the controller 140 is configured to measure a potential difference between the tank 102 and soil 106 surrounding the tank 102. In at least one embodiment, the controller 140 is configured to measure the potential difference when the moisture associated with the tank 102 is measured to be above a predetermined threshold. In at least one embodiment, the controller 140 is configured to refrain from measuring the potential difference when the moisture associated with the tank 102 is measured to be below the predetermined threshold.

In at least one embodiment, the controller 140 is configured to monitor the anode 110 using the anode sensor 160. In at least one embodiment, the controller 140 is configured to alert a user when the anode 110 should be replaced. In at least one embodiment, the controller 140 is configured to monitor the anode 110 over time using the anode sensor 160 and predict when the anode 110 will no longer provide sufficient galvanic protection to the tank 102.

In at least one embodiment, the anode sensor 160 at least partially surrounds the anode 110 of the tank 102. In at least one embodiment, the anode 110 of the tank 102 at least partially surrounds the anode sensor 160. In at least one embodiment, the anode sensor 160 includes a plurality of inductive coils 162. In at least one embodiment, the anode sensor 160 includes its own processor 166 separate from but in electrical communication with the controller 140.

In at least one embodiment, a system 100 for monitoring an underground propane tank 102 comprises a controller 140; a remote user interface 150 in electronic communication with the controller 140; and an anode sensor 160 coupled to an anode 110 of the tank 102 and coupled in communication with the controller 140. In at least one embodiment, the controller 140 is configured to monitor the anode 110 over time using the anode sensor 160 and provide an indication, through the remote user interface 150, of when the anode 110 will no longer provide sufficient galvanic protection to the tank 102.

In at least one embodiment, a system 100 for monitoring underground propane tanks 102 comprises a controller 140; a plurality of probes 120 coupled in communication with the controller 140, wherein each probe 140 is adapted to be disposed at least partially underground; and a moisture sensor 130 coupled in communication with the controller 140.

In at least one embodiment, the system 100 is adapted to measure a potential difference between a propane tank 102 and soil 106 surrounding the propane tank 102. In at least one embodiment, the system 100 is adapted to measure the potential difference based on a signal from the moisture sensor 130. In at least one embodiment, the system 100 is adapted to determine the moisture content of at least a portion of the soil 106 prior to measuring or at the time of measuring the potential difference. In at least one embodiment, the system 100 is adapted to refrain from measuring the potential difference when the soil 106 has a moisture content below a predetermined level.

In at least one embodiment, the moisture sensor 130 is coupled to one of the plurality of probes 120. In at least one embodiment, the system 100 includes a plurality of moisture sensors 130 and wherein each of the plurality of probes 120 has a moisture sensor coupled thereto.

In at least one embodiment, the system 100 includes a wireless transmitter 142 coupled in communication with the controller 140. In at least one embodiment, the system 100 includes a remote user interface 150 in electronic communication with the controller 140. In at least one embodiment, the system 100 is adapted to alert a user when an anode 110 associated with a propane tank 102 should be replaced. In at least one embodiment, the system 100 is adapted to record and store measurement data in a database.

Embodiments of the disclosure can be utilized for numerous types of tanks 102, including but not limited to at least partially metal tanks disposed at least partially in contact with soil 106 and/or at least partially underground. As referred to herein, an "underground" tank can but need not be disposed wholly underground and, in at least some cases, can have one or more housings, access ports 108 or other parts or components disposed above or accessible at ground level 104. Such tanks 102 can be used to hold numerous different substances, including but not limited to, liquid propane gas (LPG), liquid natural gas (LNG) and other substances commonly used as fuel sources or otherwise in residential and/or commercial settings (including, e.g., water).

In at least one embodiment, the devices, systems and methods of the present disclosure (or one or more components thereof) can comprise one or more aspects or features of one or more embodiments disclosed in Applicants' U.S. Pat. No. 10,571,328 issued Feb. 25, 2020 and/or in one or more of Applicants' U.S. Patent Application No. 62/966,452 filed Jan. 27, 2020 and Ser. No. 16/801,135 filed Feb. 25, 2020, the entire contents of which are hereby incorporated by reference herein.

As will be appreciated by one of ordinary skill in the art having the benefits of the present disclosure, aspects of the embodiments can be embodied as a system, method or computer program product. Accordingly, aspects of the present embodiments can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing. Computer program code for carrying out operations for aspects of the present disclosure can be written in any combination of one or more programming languages, including an object-oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present disclosure can be and/or are described with reference to flowchart illustrations and/or block diagrams of methods, apparatus (systems) and computer program products according to embodiments of the disclosure. Each block of a flowchart illustration and/or block diagram, and combinations of blocks in the flowchart illustrations and/or block diagrams, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions can also be stored in a computer readable medium (which can be or include any non-transitory computer readable media) that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions can also be loaded onto a computer, other programmable data processing apparatus, or other devices to cause a series of operational steps to be performed on the computer, other programmable apparatus or other device(s) to produce a computer implemented process such that the instructions which execute on the computer or other programmable apparatus provide processes for implementing the functions/acts specified in a flowchart and/or block diagram block or blocks.

Other and further embodiments utilizing one or more aspects of the disclosure can be devised without departing from the spirit of Applicants' disclosure. For example, the devices, systems and methods can be implemented for tanks of numerous different types and sizes among numerous different industries. Further, the various methods and embodiments of the sensors and sensor arrangements can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the inventions has been described. Obvious modifications and alterations to the described embodiments are available to those of ordinary skill in the art having the benefits of the present disclosure. The disclosed and undisclosed embodiments are not intended to limit or restrict the scope or applicability of the inventions conceived of by the Applicants, but rather, in conformity with the patent laws, Applicants intend to fully protect all such modifications and improvements that come within the scope or range of equivalents of the following claims.

What is claimed is:

1. A system for monitoring an underground tank, comprising:
   a controller;
   a moisture sensor coupled in communication with the controller, wherein the controller is configured to measure a moisture associated with the tank;
   a voltage probe coupled in communication with the controller, wherein the voltage probe is adapted to be disposed at least partially underground, and wherein the controller is configured to measure a potential difference between the tank and soil surrounding the tank, when the moisture associated with the tank is measured to be above a predetermined threshold; and
   an anode sensor coupled to an anode of the tank and coupled in communication with the controller, wherein the controller is configured to monitor the anode using the anode sensor, and wherein the controller is configured to refrain from measuring the potential difference when the moisture associated with the tank is measured to be below the predetermined threshold.

2. The system of claim 1, wherein the controller is configured to alert a user when the anode should be replaced.

3. The system of claim 1, further comprising a remote user interface in electronic communication with the controller.

4. The system of claim 1, wherein the anode sensor is wrapped around the anode of the tank.

5. The system of claim 1, wherein the anode sensor is disposed at least partially within the anode of the tank.

6. The system of claim 1, wherein the anode sensor includes a plurality of inductive coils.

7. The system of claim 1, wherein the anode sensor includes a processor distal from but in electrical communication with the controller.

8. The system of claim 1, wherein the controller is configured to monitor the anode over time using the anode sensor and predict when the anode will no longer provide sufficient galvanic protection to the tank, and wherein at least a portion of the anode sensor is disposed in electrical sensing communication with a radially facing surface of the anode.

9. A system for monitoring an underground tank, comprising:
   a controller;
   a remote user interface in electronic communication with the controller; and
   an anode sensor coupled to an anode of the tank and coupled in communication with the controller, wherein the anode sensor is wrapped around the anode of the tank;
   wherein the controller is configured to monitor the anode over time using the anode sensor, predict when the anode will no longer provide sufficient galvanic protection to the tank, and provide an indication, through the remote user interface, of when the anode will no longer provide sufficient galvanic protection to the tank.

10. A system for monitoring underground tanks, comprising:
    a controller;
    an anode sensor wrapped around an anode of a tank and coupled in communication with the controller;
    a plurality of probes coupled in communication with the controller, wherein each probe is adapted to be disposed at least partially underground; and
    a moisture sensor coupled in communication with the controller;
    wherein the system is adapted to measure a potential difference between the tank and soil surrounding the tank, and wherein the system is adapted to refrain from measuring the potential difference when the soil has a moisture content below a predetermined level.

11. The system of claim 10, further comprising a wireless transmitter coupled in communication with the controller.

12. The system of claim 10, wherein the system is configured to automatically measure the potential difference based on a signal from the moisture sensor.

13. The system of claim 10, wherein the system is configured to automatically determine the moisture content of at least a portion of the soil prior to measuring or at the time of measuring the potential difference.

14. The system of claim 10, wherein the system is adapted to record and store measurement data in a database.

15. The system of claim 10, wherein the system is adapted to alert a user when the anode associated with the tank should be replaced.

16. The system of claim 10, wherein the moisture sensor is coupled to one of the plurality of probes.

17. The system of claim 10, further comprising a plurality of moisture sensors and wherein each of the plurality of probes has a moisture sensor coupled thereto.

18. The system of claim 10, further comprising a remote user interface in electronic communication with the controller.

19. The system of claim 9, wherein the system further includes a voltage probe coupled in communication with the controller, wherein the controller is configured to measure a potential difference between the tank and soil surrounding the tank, and wherein the controller is configured to refrain from measuring the potential difference when the soil has a moisture content below a predetermined level.

20. A system for monitoring an underground tank, comprising:
    a controller;
    a moisture sensor coupled in communication with the controller, wherein the controller is configured to measure a moisture associated with the tank;
    a voltage probe coupled in communication with the controller, wherein the voltage probe is adapted to be disposed at least partially underground, and wherein the controller is configured to measure a potential difference between the tank and soil surrounding the tank, when the moisture associated with the tank is measured to be above a predetermined threshold; and
    an anode sensor coupled to an anode of the tank and coupled in communication with the controller, wherein the anode sensor includes at least one inductive coil and is wrapped around the anode, and wherein the controller is configured to monitor the anode over time using the anode sensor and predict when the anode will no longer provide sufficient galvanic protection to the tank.

* * * * *